United States Patent
Mori et al.

(10) Patent No.: US 6,931,064 B2
(45) Date of Patent: Aug. 16, 2005

(54) MOTION PICTURE DATA CONVERTER, AND COMPUTER PRODUCT

(75) Inventors: Masashi Mori, Tokyo (JP); Kunio Nakaoka, Tokyo (JP); Hiroaki Sakai, Tokyo (JP); Yoshinari Sugegaya, Tokyo (JP); Akihiko Naito, Tokyo (JP); Masaki Yamakawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 526 days.

(21) Appl. No.: 10/071,089

(22) Filed: Feb. 11, 2002

(65) Prior Publication Data

US 2003/0058946 A1 Mar. 27, 2003

(30) Foreign Application Priority Data

Sep. 21, 2001 (JP) ........................................ 2001-290110

(51) Int. Cl.[7] .............................................. H04N 7/18
(52) U.S. Cl. ............................... 375/240.16; 375/240.17
(58) Field of Search ........................ 375/240.11–240.26

(56) References Cited

U.S. PATENT DOCUMENTS 6,625,211 B1 * 9/2003 Etoh et al. ............. 375/240.03
6,647,061 B1 * 11/2003 Panusopone et al. .. 375/240.12
6,671,322 B2 * 12/2003 Vetro et al. ............ 375/240.16
6,728,317 B1 * 4/2004 Demos .................. 375/240.21
6,738,423 B1 * 5/2004 Lainema et al. ....... 375/240.03

* cited by examiner

*Primary Examiner*—Andy Rao
(74) *Attorney, Agent, or Firm*—Birch, Stewart, Kolasch & Birch, LLP

(57) ABSTRACT

In the motion picture data converter, an MPEG-2 decoding unit decodes motion picture data in an MPEG-2 format into motion picture data in an non-compressed format, a motion vector extraction unit extracts motion vector information from the motion picture data being decoded in said MPEG-2 decoding unit, a motion compensation unit generates the motion vector information in the MPEG-4 format, by causing the extracted motion vector information to be reflected in the motion compensation processing for the MPEG-4 format, and executes the motion compensation processing based on the motion vector information, and an MPEG-4 encoding unit encodes motion picture data in the MPEG-4 format, using the motion compensation processed data and the motion picture data in the non-compressed format.

12 Claims, 10 Drawing Sheets

FIG.1
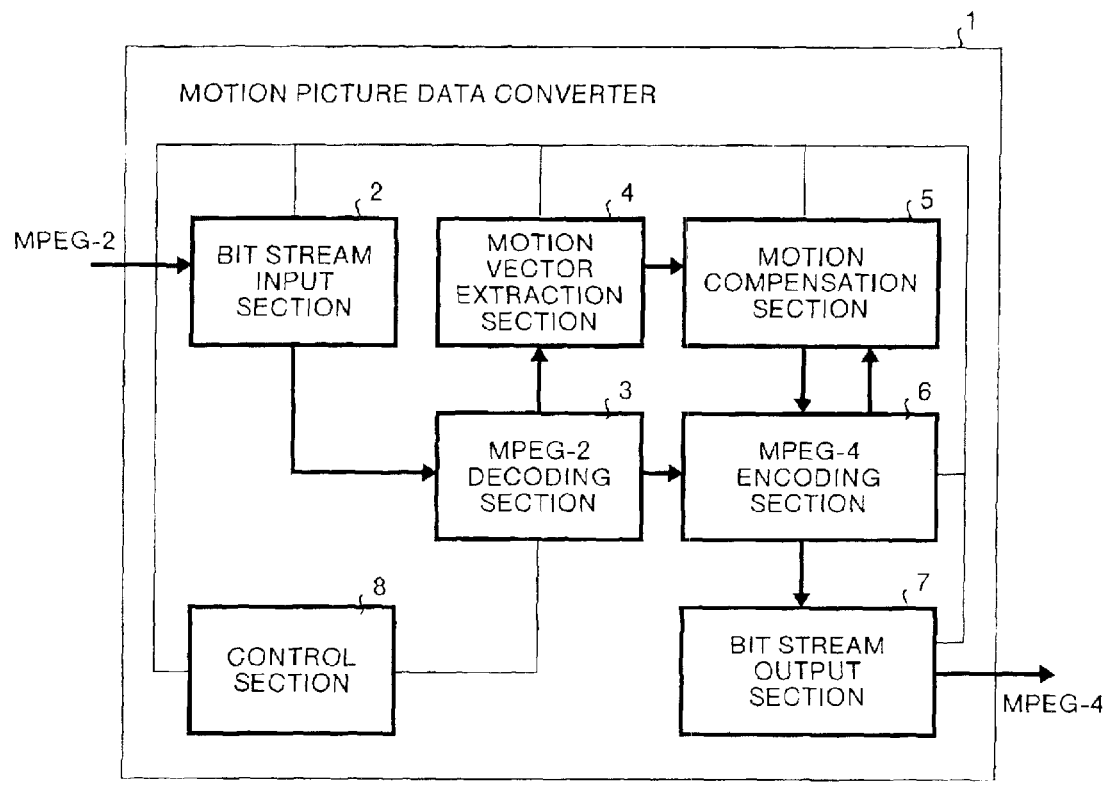
FIG.2
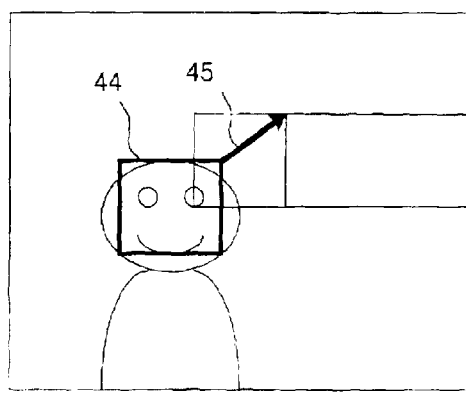
(a)
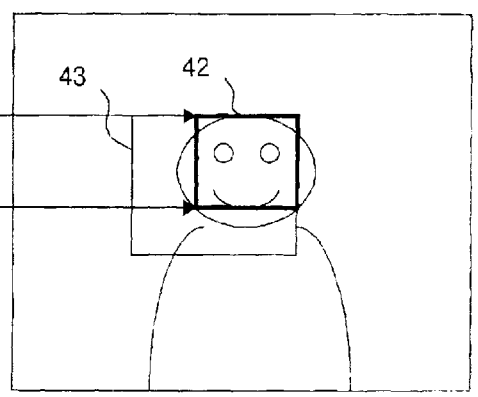
(b)

MOTION PICTURE DATA CONVERTER, AND COMPUTER PRODUCT

FIELD OF THE INVENTION

The present invention relates to a motion picture data converter and a computer program for converting motion picture data in the MPEG-2 format to motion picture data in the MPEG-4 format.

BACKGROUND OF THE INVENTION

In order to convert motion picture data in the MPEG-2 format to motion picture data in the MPEG-4 format, there has heretofore been adopted a method in which the motion picture data in the MPEG-2 form is decoded into a non-compressed format, and this motion picture data is encoded into the MPEG-4 format, to thereby convert it into the motion picture data in the MPEG-4 format.

Two conventional techniques for converting the motion picture data in the MPEG-2 format to the motion picture data in the MPEG-4 format will be described with reference to FIG. 12 and FIG. 13.

In one conventional technique, as shown in FIG. 12, the conventional motion picture data converter 33 comprises a bit stream input section 34, an MPEG-2 decoder 35, an MPEG-4 encoder 36, and a bit stream output section 37. The motion picture data in the MPEG-2 format is input into the MPEG-2 decoder 35 via the bit stream input section 34. The MPEG-2 decoder 35 decodes the motion picture data in the MPEG-2 format into the non-compressed format, and output it to the MPEG-4 encoder 36. The MPEG-4 encoder 36 encodes the data decoded into the non-compressed format to the motion picture data in the MPEG-4 format, and output this data to the bit stream output section 37. The bit stream output section 37 outputs the motion picture data in the MPEG-4 format.

In the other conventional technique, as shown in FIG. 13, in a motion picture data converter 38, the motion picture data in the MPEG-2 format is input to the bit stream input section 39, and the MPEG-2 format data is decoded into the non-compressed format with the software, using a general-purpose central processing unit 40, and then encoded into the motion picture data in the MPEG-4 format, to thereby output the motion picture data in the MPEG-4 format from the bit stream output section 41.

Whether the conversion of the motion picture data in the MPEG-2 format to the motion picture data in the MPEG-4 is performed using hardware or software, it is necessary to provide the MPEG-2 decoder and the MPEG-4 encoder, or the MPEG-2 decoding program and the MPEG-4 encoding program.

Moreover, in order to confirm the image quality of the motion picture data converted from the MPEG-2 format to the MPEG-4 format, there has heretofore been taken a method of reproducing the motion picture data in the MPEG-2 format before conversion and the motion picture data in the MPEG-4 format after conversion, respectively separately, to compare the image quality of the motion picture.

As described above, with the conventional art, at the time of converting the motion picture data in the MPEG-2 format to the motion picture data in the MPEG-4 format, after the motion picture data in the MPEG-2 format is first decoded into the non-compressed format, all the encoding processing (motion detection, motion compensation, encoding, etc.) of the MPEG-4 format must be executed using the motion picture data in the non-compressed format. Hence, it is necessary to prepare an MPEG-4 encoder that can execute all the processing of motion detection, motion compensation and encoding, thereby causing a problem in that the circuit scale of the apparatus increases. Moreover, when the conventional method is realized as the software for the general-purpose central processing unit, there is a problem in that the processing time increases.

Most of the above-described problems are attributable to the search processing of the motion vectors. The search processing of motion vectors stands for searching the most analogous area with respect to the area to be encoded in the current frame, from the search range in the adjacent frame. The motion vector is expressed as a motion vector from the frame search area in the adjacent frame to the area to be encoded in the current frame.

With the conventional art, at the time of converting the motion picture data in the non-compressed format into the motion picture data in the MPEG-4 format, it is necessary to perform complete survey, using the frame of the non-compressed picture, in the above-described motion vector search processing. Hence, there are such problems that the circuit scale of the apparatus increases, and the processing time increases.

Also, with the conventional art, since the motion picture data in the MPEG-2 format before conversion and the motion picture data in the MPEG-4 format after conversion are reproduced respectively separately, to compare the image quality of the motion picture, the correspondence between the motion picture data before the conversion and the motion picture data after the conversion at the same point in time is incomprehensible, making it difficult to confirm whether the parameters such as the screen size, bit rate, target frame rate, etc. of the motion picture data in the MPEG-4 format are appropriate or not.

SUMMARY OF THE INVENTION

It is an object of the present invention to provide a motion picture data converter and a computer program for converting motion picture data, in which the circuit scale of the apparatus is reduced and the processing time is shortened, while keeping the image quality of the motion picture data after conversion, and further it is made easy to confirm the image quality of the motion picture data after conversion.

The motion picture data converter according to one aspect of the present invention comprises an MPEG-2 decoding unit which decodes motion picture data in an MPEG-2 format into motion picture data in anon-compressed format, a motion vector extraction unit which extracts motion vector information from the motion picture data being decoded in said MPEG-2 decoding unit, a motion compensation unit which generates the motion vector information in the MPEG-4 format, by causing the extracted motion vector information to be reflected in the motion compensation processing for the MPEG-4 format, and executes the motion compensation processing, using the generated motion vector information, and an MPEG-4 encoding unit which encodes motion picture data in the MPEG-4 format, using the motion compensation processed data output from said motion compensation unit and the motion picture data in the non-compressed format decoded in said MPEG-2 decoding unit.

The computer program for converting motion picture data according to another aspect of the present invention is a computer program for making a computer convert motion picture data in an MPEG-2 format to motion picture data in an MPEG-4 format. Specifically, the computer program makes the computer execute the steps of decoding motion picture data in an MPEG-2 format into motion picture data in a non-compressed format, extracting motion vector information from the motion picture data being decoded, generating the motion vector information in the MPEG-4 format, by causing the extracted motion vector information to be reflected in the motion compensation processing for the MPEG-4 format, performing motion compensation processing using the generated motion vector information, and encoding motion picture data in the MPEG-4 format, using the motion compensation processed data and the motion picture data in the non-compressed format.

According to the present invention, attention is paid to the fact that a motion vector already exists in the motion picture data in the MPEG-2 format, and when the motion picture data in the MPEG-2 format is converted to the MPEG-4 format, at the time of encoding the motion picture data in the non-compressed format into the MPEG-4 format, exhaustive search is not directly performed with respect to the motion vector, but the motion vector already existing in the motion picture data in the MPEG-2 format is extracted and converted so as to be adapted to the motion picture data in the MPEG-4 format, and is used in the motion compensation processing of the MPEG-4 encoding processing.

Other objects and features of this invention will become apparent from the following description with reference to the accompanying drawings.

BRIEF DESCRIPTION OF THE DRAWINGS

FIG. 1 is a block diagram showing the construction of a first embodiment of the present invention;

FIG. 2A and FIG. 2B are diagrams for explaining a general method for searching a motion vector;

DETAILED DESCRIPTIONS

Figure 3A:
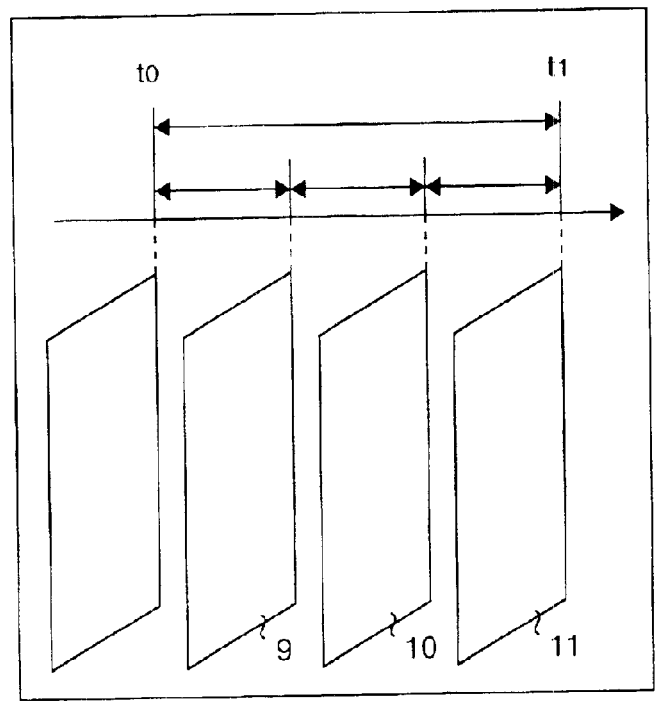
FIG. 3A and FIG. 3B are diagrams showing the correspondence between a picture in the MPEG-4 format and a picture in the MPEG-2 format.

Embodiment(s) of the motion picture data converter and the computer program for converting motion picture data according to the present invention will now be described in detail below with reference to the accompanying drawings.

There are several types of the motion picture encoding modes in the MPEG-2 and MPEG-4. In the embodiments below, a case will be explained in which MP@ML (main level of a mail profile) is used for the MPEG-2, and the most basic profile of MPEG-4 referred to as a simple profile is used for the MPEG-4.

FIG. 1 is a block diagram showing the construction of the motion picture data converter according to a first embodiment. The motion picture data converter 1 has a bit stream input section 2, an MPEG-2 decoding section 3, a motion vector extraction section 4, a motion compensation section 5, an MPEG-4 encoding section 6, a bit stream output section 7, and a controlling section 8 which controls the entire operation of the motion picture data converter 1.

The bit stream input section 2 inputs the motion picture data in the MPEG-2 format (encoded bit stream) and executes variable length decoding or the like of the input motion picture data in the MPEG-2 format.

The MPEG-2 decoding section 3 has a function of decoding the motion picture data in the MPEG-2 format to the motion picture data in the non-compressed format. At the time of this decoding, normal decoding processing is performed, wherein a differential signal between a macro block, being a target, and a corresponding predicted macro block is obtained by performing inverse quantization of a quantized discrete cosine transform (DCT) coefficient and inverse DCT, as well as decoding the motion vector and obtaining a predicted macro block based on the motion vector, and by adding the predicted macro block to the differential signal, the motion picture data in the non-compressed format is obtained. The MPEG-2 decoding section 3 outputs the decoded motion picture data in the non-compressed format to the MPEG-4 encoding section 6.

The motion vector extraction section 4 extracts a motion vector from the data being decoded in the MPEG-2 decoding section 3, and outputs the extracted motion vector information in the MPEG-2 format to the motion compensation section 5. That is to say, in the motion picture data in the MPEG-2 format having been subjected to the variable length decoding, a motion vector already exists. The motion vector extraction section 4 extracts the motion vector from the motion picture data in the MPEG-2 format during decoding, by extracting the motion vector existing in a predetermined time slot in the motion picture data frame in the MPEG-2 format, or extracting a motion vector during decoding.

The motion compensation section 5 generates motion vector information in the MPEG-4 format, in which the extracted motion vector information is reflected in the MPEG-4 format motion compensation processing, and executes the motion compensation processing in the MPEG-4 format using the generated motion vector information. More specifically, the motion compensation section 5 uses the generated motion vector information in the MPEG-4 format and locally decoded data (reference frame) input from the MPEG-4 encoding section 6, to perform motion compensation of the reference frame to thereby obtain an optimum predicted macro block. The motion compensation section 5 outputs this obtained predicted macro block to the MPEG-4 encoding section 6.

The MPEG-4 encoding section 6 uses the output of the motion compensation section 5 and the motion picture data in the non-compressed format decoded by the MPEG-2 decoding section 3, to execute the encoding processing into the motion picture data in the MPEG-4 format. More specifically, the MPEG-4 encoding section 6 obtains the difference between a macro block (output of the MPEG-2 decoding section 3), being a target, and a corresponding predicted macro block (output of the motion compensation section 5), and subjects this differential signal to DCT, and quantizes the DCT coefficient. Then, the MPEG-4 encoding section 6 inputs the quantized DCT coefficient, the motion vector and the quantized width to the bit stream output section 7. On the other hand, what is obtained by quantizing the DCT coefficient is subjected to inverse quantization, and inverse DCT, to thereby obtain locally decoded motion picture data. This locally decoded motion picture data is output to the motion compensation section 5, so as to be used for the motion compensation processing.

The bit stream output section 7 performs variable length encoding or the like to the motion picture data in the MPEG-4 format including the input quantized DCT coefficient, motion vector and quantized width, and outputs the motion picture data to the outside.

The whole control section 8 has functions of supervising and controlling each constituent in the motion picture data converter 1, and instructing the operation parameter such as screen size, bit rate, target frame rate, etc. of the motion picture data in the MPEG-4 format.

Next, the concept of the motion vector, picture, macro block or the like necessary for explaining the processing performed in the motion vector extraction section 4 and the motion compensation section 5 will be described.

Normal search processing of motion vector will be described first, with reference to FIG. 2A and FIG. 2B. FIG. 2A shows a previous frame and FIG. 2B shows a current frame. A predetermined search range 43 set in relation to a target area 42, being a target to be encoded, is determined in the current frame shown in FIG. 2B, to thereby search the most analogous area 44 to the target area 42 in the search range 43 in the previous frame shown in FIG. 2A. Then, the direction and the size of the motion from the searched analogous area 44 to the target area 42 are determined, which is designated as a motion vector 45 of the target area 42. That is to say, the motion vector stands for the information indicating the direction and the size of a motion of a block area having a predetermined size between two frames. The above-described target area 42, being a search unit of the motion vector generally corresponds to a macro block described later. In the conventional method, such motion vector search processing performs a complete survey, however, in the converter of the present invention, a motion vector already existing in the motion picture data in the MPEG-2 format is used, and this kind of motion vector search processing is omitted.

Next, the correspondence between the picture in the MPEG-4 format and the picture in the MPEG-2 format will be described, with reference to FIG. 3A and FIG. 3B. The motion picture data in the MPEG-2 format and in the MPEG-4 format is divided into picture frames and encoded. A unit of this divided picture frame is referred to as a picture. In the case of an interlaced motion picture, it is also possible to designate the picture as a unit of a picture field.

Figure 3B:
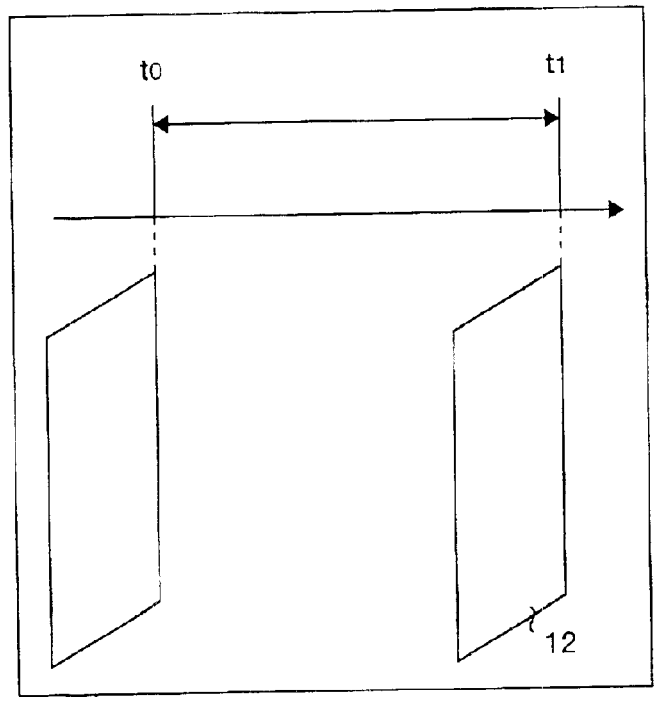

FIG. 3A shows a picture in the MPEG-2 format in the case of a frame rate of 30 fps (Frame per Second). FIG. 3B shows a picture in the MPEG-4 format in the case of a frame rate of 10 fps. As shown in FIG. 3B, pictures in the MPEG-4 format existing in the period of time from certain time t0 to t1 is only picture 12. On the other hand, in the case of the MPEG-2 format, as shown in FIG. 3A, three pictures, picture 9, picture 10 and picture 11 exist in the period of time from time t0 to t1. These three pictures 9, 10 and 11 in the MPEG-2 format correspond to the picture 12 in the MPEG-4 format. That is to say, a plurality of pictures in the MPEG-2 format existing in the same range timewise as that of the picture in the MPEG-4 format becomes the picture in the MPEG-2 format corresponding to the picture in the MPEG-4 format.

Next, the correspondence between the macro block in the MPEG-4 format and the macro block in the MPEG-2 format will be described with reference to FIG. 4. The macro block stands for a division unit when the picture is divided, for example, for each 16 pixels×16 lines, and the existence of the motion vector is specified for each macro block, and when the motion vector exists, the motion vector can be specified.

Figure 4:
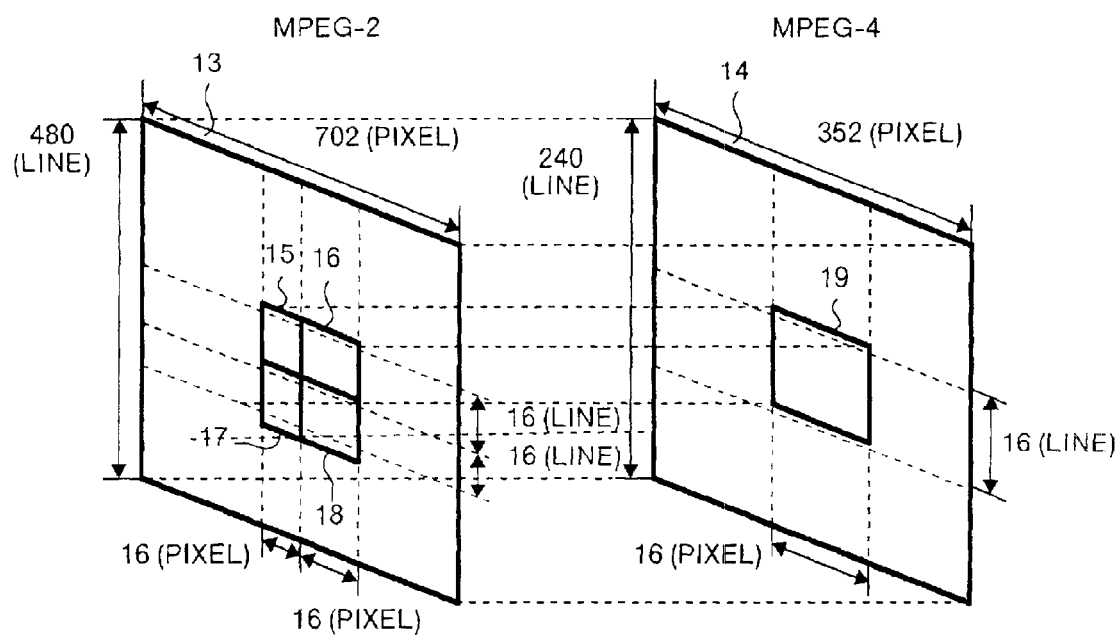
FIG. 4 is a diagram showing the correspondence between a macro block in the MPEG-4 format and macro blocks in the MPEG-2 format.

In FIG. 4, the picture in the MPEG-2 format before the conversion is designated as 702 pixels×480 lines, and the picture in the MPEG-4 format after the conversion is designated as 352 pixels×240 lines. The picture 14 in the MPEG-4 format is matched in the scale with that of the picture 13 in the MPEG-2 format, and in this state, the picture 13 in the MPEG-2 format and the picture 14 in the MPEG-4 format of which scale has been matched with that of the picture 13 in the MPEG-2 format are divided into the above-described macro blocks, respectively. In the area overlapping on one macro block 19 of the picture in the MPEG-4 format, four macro blocks 15, 16, 17 and 18 of the picture in the MPEG-2 format exist. That is to say, the macro blocks in the MPEG-2 format corresponding to the macro block in the MPEG-4 format stands for macro blocks overlapping on and existing in the area of the macro block of the picture in the MPEG-4 format, in the state with the scale of the picture in the MPEG-4 format being matched with that of the picture in the MPEG-2 format.

Figure 5:
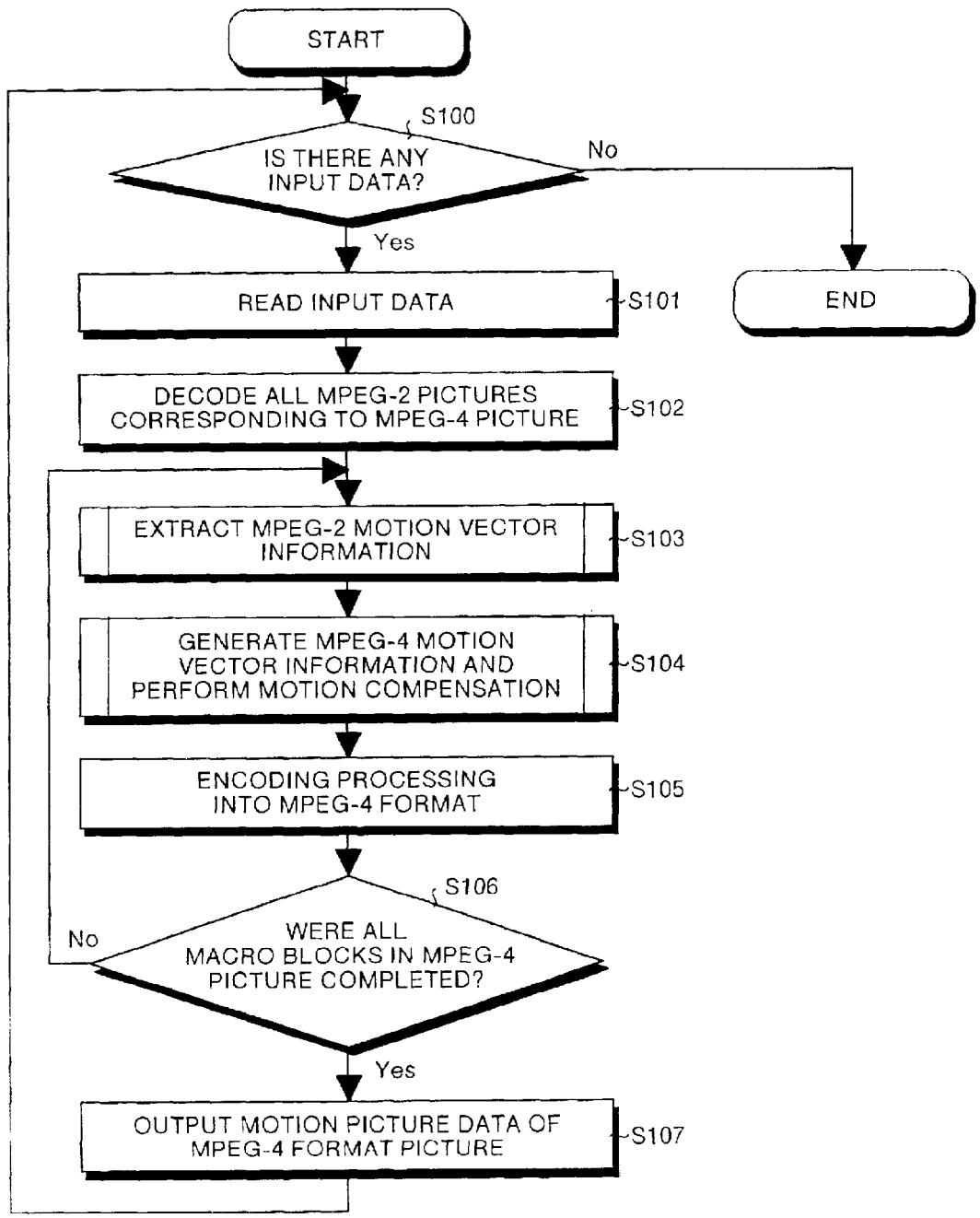
FIG. 5 is a flowchart showing the operation procedure of the motion picture data converter shown in FIG. 1.
Figure 6:
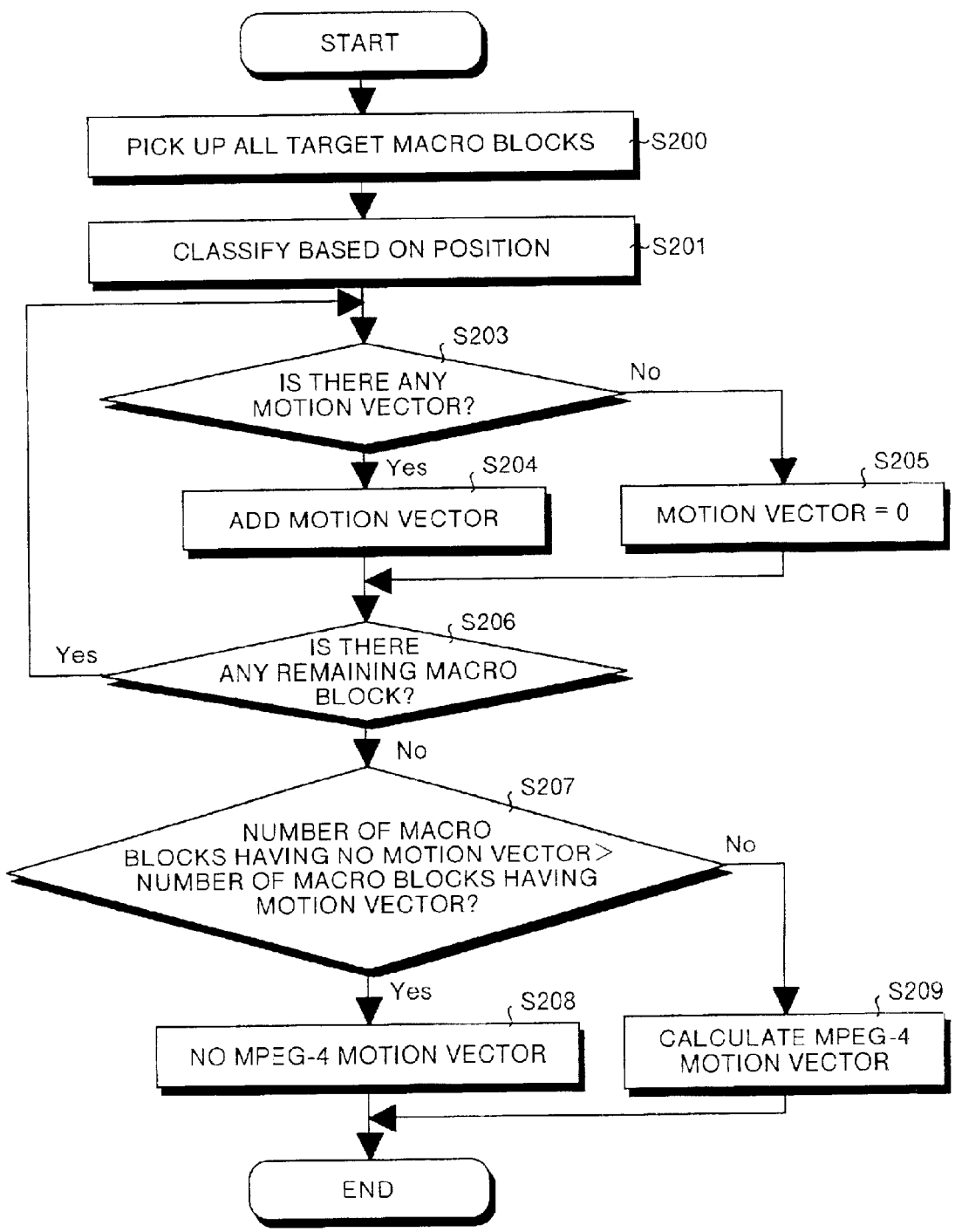
FIG. 6 is a flowchart showing the operation procedure of the motion picture data converter shown in FIG. 1.

The operation of the motion picture data converter 1 will now be described with reference to the flowcharts in FIG. 5 and FIG. 6. FIG. 5 shows the overall operation of the motion picture data converter 1, and FIG. 6 shows detailed operation of the motion vector extraction section 4 and the motion compensation section 5. When there is an input of the motion picture data in the MPEG-2 format (step S100), the bit stream input section 2 reads the input data, and subjects the read motion picture data in the MPEG-2 format to the variable length decoding or the like, and outputs the data to the MPEG-2 decoding section 3 (step S101).

The MPEG-2 decoding section 3 decodes all pictures in the MPEG-2 format corresponding to the picture in the MPEG-4 format, in accordance with the specified target frame rate (step S102).

The motion vector extraction section 4 executes the extraction processing with respect to the motion vector information of the macro block in the MPEG-2 format, being a target (step S103).

The motion compensation section 5 generates motion vector information in the MPEG-4 format, based on the motion vector information extracted in the motion vector extraction section 4, and uses the generated motion vector information in the MPEG-4 format and the locally decoded data input from the MPEG-4 encoding section 6, to execute the motion compensation processing (step S104).

The processing performed in these motion vector extraction section 4 and motion compensation section 5 will now be described in detail with reference to FIG. 6.

At first, the motion vector extraction section 4 picks up all the macro blocks in the MPEG-2 format corresponding to the macro block in the MPEG-4 format to be encoded now (step S200). Here, all the macro blocks in the MPEG-2 format corresponding to the macro block in the MPEG-4 format to be encoded now stands for a plurality of macro blocks in the MPEG-2 format overlapping on and existing in the area of the macro block in the MPEG-4 format, in the state that the scale matching is performed, as described above with reference to FIG. 4.

The motion vector extraction section 4 classifies all the picked up macro blocks in the MPEG-2 format corresponding to the macro block in the MPEG-4 format to be encoded now for each position of the macro block in the MPEG-2 format picture (step S201). For example, as shown in FIG. 4, the macro blocks 15, 16, 17 and 18 in the MPEG-2 format exist in four positions with respect to the macro block 19 in the MPEG-4 format, and as shown in FIG. 3A and FIG. 3B, three pictures 9, 10 and 11 in the MPEG-2 format exist corresponding to the picture 12 in the MPEG-4 format. Hence, as described above, if all the macro blocks in the MPEG-2 format are classified for each position, as described above, three macro blocks exist corresponding to one position.

Next, the motion vector extraction section 4 judges the existence of a motion vector, with respect to a plurality of (in this case, three) macro blocks at the same position (step S203). That is to say, of the macro blocks in the MPEG-2 format at the same position, if there is even one macro block having no motion vector, it is assumed that there is no motion vector in the macro block in the MPEG-2 format at that position (step S205).

On the other hand, if there is a motion vector in all the macro blocks in the MPEG-2 format at the same position, the motion vectors in the plurality of macro blocks in the MPEG-2 format included in the same position are added, and this addition result is designated as a motion vector at this position (step S204).

For example, when there is a motion vector in the macro block 15 of the MPEG-2 format picture 9, and there is no motion vector in the macro block 15 of the MPEG-2 format picture 10, it is assumed that there is no motion vector at the position of the macro block 15. It is assumed that only when all the macro blocks 15 of three pictures 9, 10 and 11 in the MPEG-2 format have a motion vector, there is a motion vector at the position of the macro block 15, and the motion vector of the macro block 15 in the pictures 9, 10 and 11 in the MPEG-2 format are added.

The motion vector extraction section 4 repeatedly executes such processing, until there is no MPEG-4 format macro block to be encoded (step S206, S203 to S205).

When the above processing is completed, the motion vector extraction section 4 inputs the motion vector information including the plurality of (in this case, four) motion vectors in the MPEG-2 format per one macro block in the MPEG-4 format, which is extracted in the above-described manner, to the motion compensation section 5.

In the motion compensation section 5, the motion vector in each macro block in the MPEG-4 format to be encoded now is calculated, based on the motion vector information input from the motion vector extraction section 4. That is to say, by examining the abundance ratio of macro blocks having a motion vector of the plurality of MPEG-2 format macro blocks included in each MPEG-4 format macro block, the existence of the motion vector in each MPEG-4 format macro block is determined. Moreover, with respect to the macro block determined to have a motion vector, the motion vector in the MPEG-4 format macro block is calculated, using a plurality of motion vectors in the MPEG-2 format having a motion vector, included in this MPEG-4 format macro block.

Specifically, the number of macro blocks having no motion vector and the number of macro blocks having a motion vector, in the plurality of MPEG-2 format macro blocks included in the MPEG-4 form at macro block, are compared (step S207), and when the number of macro blocks having a motion vector is less than the number of macro blocks having no motion vector, it is assumed that there is no motion vector in this MPEG-4 format macro block (step S208). On the other hand, when the number of macro blocks having a motion vector is larger than the number of macro blocks having no motion vector, an intermediate motion vector is generated by determining a mean value for each horizontal direction and each vertical direction of the plurality of motion vectors in the MPEG-2 format having a motion vector. Then, scaling is performed, matching this intermediate motion vector with the size of the image displayed at present, to calculate the final motion vector in the MPEG-4 format (step S209). The motion vector information including the motion vector in the MPEG-4 format corresponding to the calculated respective macro blocks is used for the motion compensation processing.

That is to say, at the time of converting the motion picture data in the MPEG-2 format to the motion picture data in the MPEG-4 format, in the motion vector extraction section 4 and the motion compensation section 5, the motion vector in the MPEG-2 format is converted so as to be adapted to the motion vector in the MPEG-4 format, without performing exhaustive search of the motion vector, and is used in the motion compensation.

In this manner, processing at step S103 and S104 shown in FIG. 5 by means of the motion vector extraction section 4 and the motion compensation section 5 is completed.

The MPEG-4 encoding section 6 determines the difference between the target macro block input from the MPEG-2 decoding section 3 and the corresponding predicted macro block input from the motion compensation section 5, and subjects this differential signal to DCT, and the DCT coefficient is quantized. Then, the MPEG-4 encoding section 6 inputs the quantized DCT coefficient, the motion vector and the quantized width to the bit stream output section 7. On the other hand, what is obtained by quantizing the DCT coefficient is subjected to inverse quantization processing, and further inverse DCT processing, and inputs this to the motion compensation section 5 as the locally decoded motion picture data. The MPEG-4 encoding section 6 executes the encoding processing into the MPEG-4 format in this manner (step S105 in FIG. 5).

Such processing is repeatedly executed with respect to all the macro blocks in the MPEG-4 picture (step S106) Then, the above-described processing is repeatedly executed until there is no input data to the bit stream input section 2 (step S100).

The bit stream output section 7 subjects the motion picture data in the MPEG-4 format including the input quantized DCT coefficient, motion vector and quantized width to the variable length encoding or the like, and outputs this data to the outside (step S107).

As described above, in this first embodiment, attention is paid to the fact that a motion vector already exists in the motion picture data in the MPEG-2 format, and when the motion picture data in the MPEG-2 format is converted to the MPEG-4 format, at the time of encoding the motion picture data in the non-compressed format into the MPEG-4 format, exhaustive search is not directly performed with respect to the motion vector, but the motion vector already existing in the motion picture data in the MPEG-2 format is used to convert the data so as to be adapted to the motion picture data in the MPEG-4 format, and is used in the motion compensation processing of the MPEG-4 encoding processing. As a result, the load in the MPEG-4 encoding processing can be reduced, and the calculation amount and the circuit scale of the conversion processing as a whole can be reduced.

It has been assumed in the above-description, that when there is even one macro block having no vector in the macro blocks in the MPEG-2 format at the same position, there is no motion vector in the MPEG-2 format at that position. However, a threshold maybe set for determining the existence of the motion vector, and when the number of existing motion vectors is less than this threshold, it may be determined that there is no motion vector. Moreover, as the method of determining a synthesized vector of a plurality of motion vectors, there may be adopted an optional method such as a method of determining a weighting average, or a method of using an appropriate function, other than the above-described method of using the mean value. In the above description, encoding is performed by directly using the motion vector calculated in the motion compensation section 5, but it is also possible to use a motion vector after search has been performed in the error accuracy range occurred due to scaling. Since the search range is limited, the number of search is considerably reduced, compared to the case where exhaustive search is performed.

Figure 7:
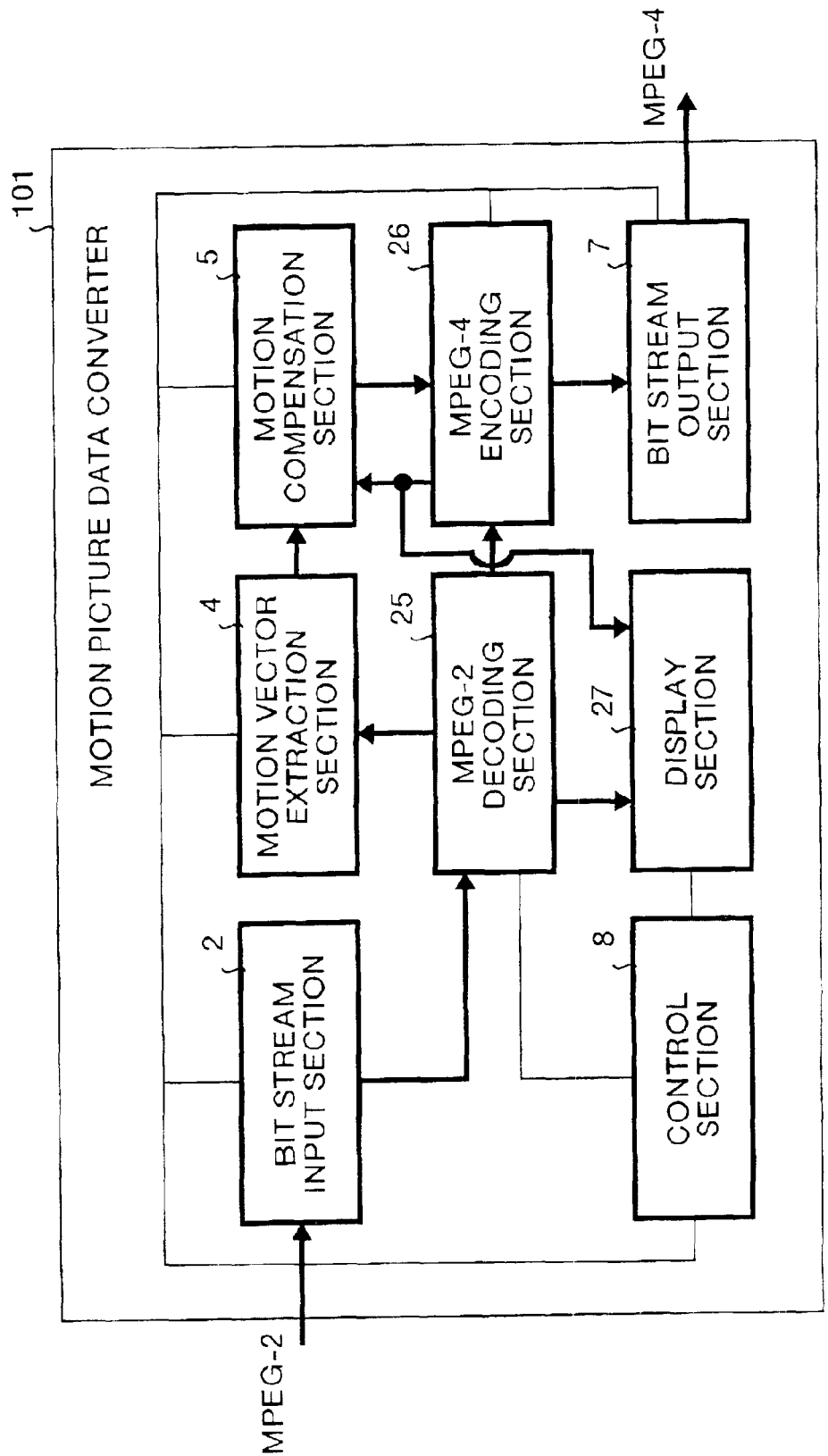
FIG. 7 is a block diagram showing the construction of a second embodiment of the present invention.

A second embodiment of the present invention will now be described. FIG. 7 is a block diagram showing the construction of the motion picture data converter in the second embodiment. In the motion picture data converter 101 in this second embodiment, a display section 27 is added. The constituents having the same function as those in the first embodiment are denoted by the same reference symbol, and the description thereof is omitted.

The MPEG-2 decoding section 25 has a function of outputting non-compressed format motion picture data in the MPEG-2 format to the display section 27, in addition to the functions that the MPEG-2 decoding section 3 in the first embodiment. The MPEG-4 encoding section 26 has a function of outputting the locally decoded data to the display section 27, in addition to the functions that the MPEG-4 encoding section 6 in the first embodiment has.

In the MPEG format encoding, a picture data decoded during encoding (locally decoded data) is also generated, for predicting motion compensation. In this second embodiment, attention is paid to this, and every time the frame conversion processing of each motion picture data is completed during the conversion processing, the motion picture frame in the MPEG-2 format before the conversion and the motion picture frame in the MPEG-4 format after the conversion are displayed in the display section 27. As a result, the correspondence between the motion picture data in the MPEG-2 format before the conversion and the motion picture data in the MPEG-4 format after the conversion at the same point in time is easily comprehensible.

Figure 8:
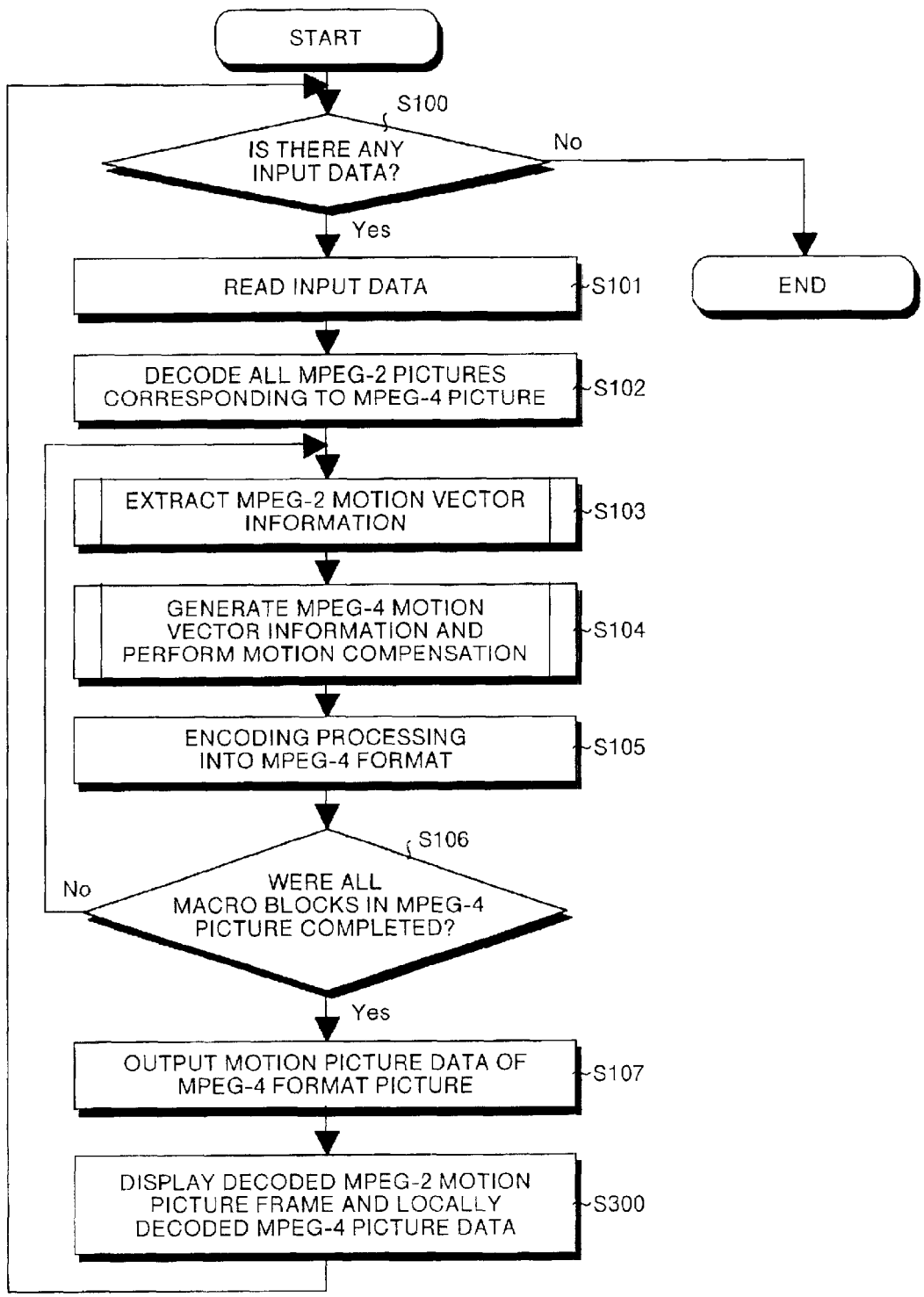
FIG. 8 is a flowchart showing the operation procedure of the motion picture data converter shown in FIG. 7.

The operation of the motion picture data converter 101 in the second embodiment will now be described, with reference to the flowchart in FIG. 8. Steps S100 to S107 for extracting the motion vector and generating the motion picture data in the MPEG-4 format are the same operation as that in the first embodiment, and hence the description thereof is omitted.

The motion picture data converter 101 converts the motion picture data in the MPEG-2 format to the motion picture data in the MPEG-4 format, in the same manner as the operation in the first embodiment, and outputs the data (steps S100 to S107). Moreover, every time the frame conversion processing is performed, the non-compressed motion picture data in the MPEG-2 format and the locally decoded data from the MPEG-2 decoding section 25 and the MPEG-4 encoding section 26 are output to the display section 27 synchronously (step S300). As a result, the motion picture frame in the MPEG-2 format before the conversion and the motion picture data in the MPEG-4 format after the conversion are displayed at the same time in the display section 27, every time the frame conversion processing of respective motion picture data is completed.

Accordingly, in the second embodiment, the correspondence between the motion picture data in the MPEG-2 format before the conversion and the motion picture data in the MPEG-4 format after the conversion at the same point in time is easily comprehensible, thereby making it easy to confirm whether the parameters such as the screen size, bit rate, target frame rate, etc. of the motion picture data in the MPEG-4 format are appropriate or not.

Figure 9:
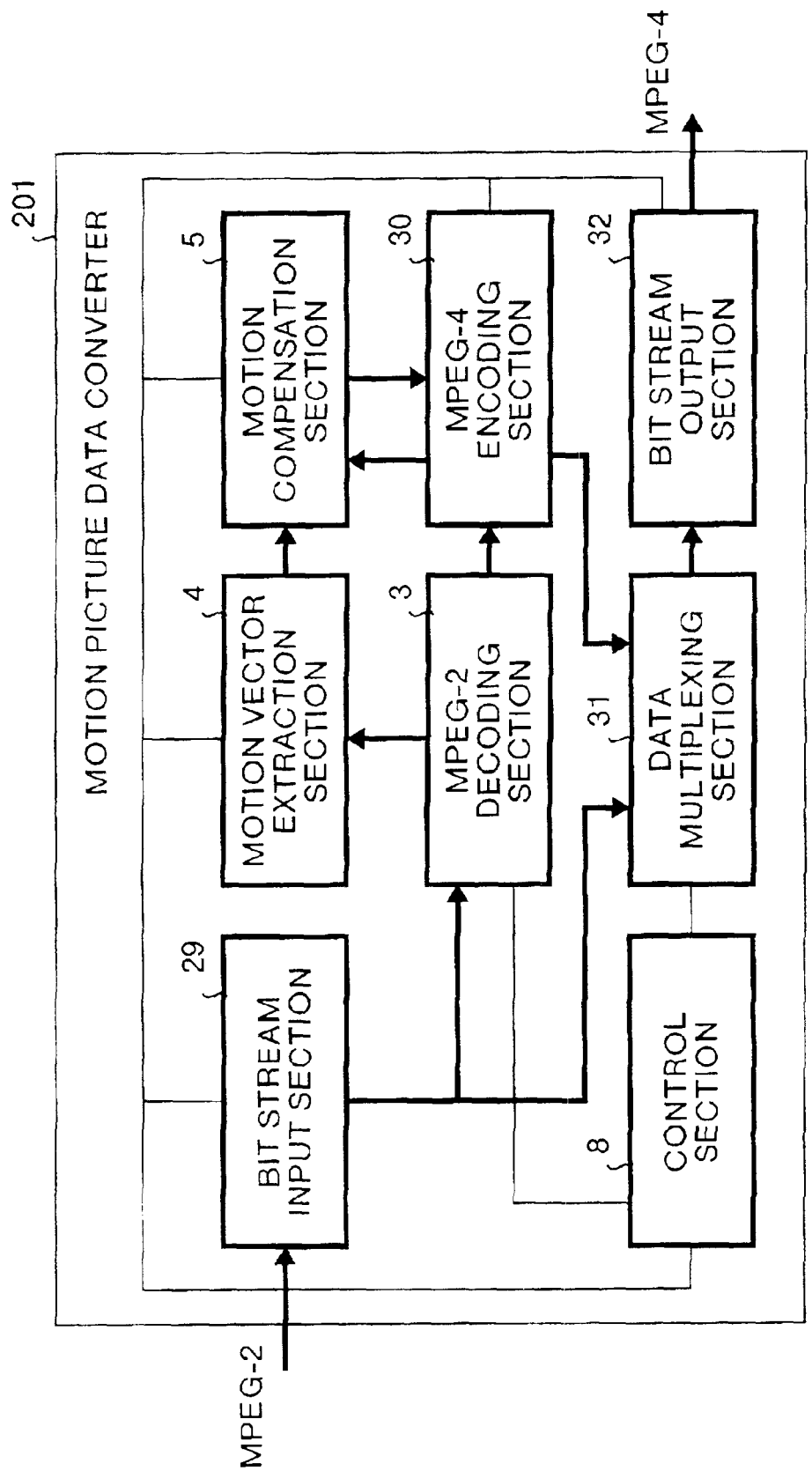
FIG. 9 is a block diagram showing the construction of a third embodiment of the present invention.

A third embodiment of the present invention will now be described. FIG. 9 is a block diagram showing the construction of the motion picture data converter in the third embodiment. In the motion picture data converter 201 in this third embodiment, a data multiplexing section 31 is added. The constituents having the same function as those in the first embodiment are denoted by the same reference symbol, and the description thereof is omitted.

The bit stream input section 29 has a function of inputting the motion picture data in the MPEG-2 format and outputting the motion picture data in the MPEG-2 format having subjected to the variable decoding or the like not only to the MPEG-2 decoding section 3, but also to the data multiplexing section 31. The MPEG-4 encoding section 30 has a function of outputting the encoded motion picture data in the MPEG-4 format to the data multiplexing section 31, in addition to the functions that the MPEG-4 encoding section 6 in the first embodiment has.

Figure 10:
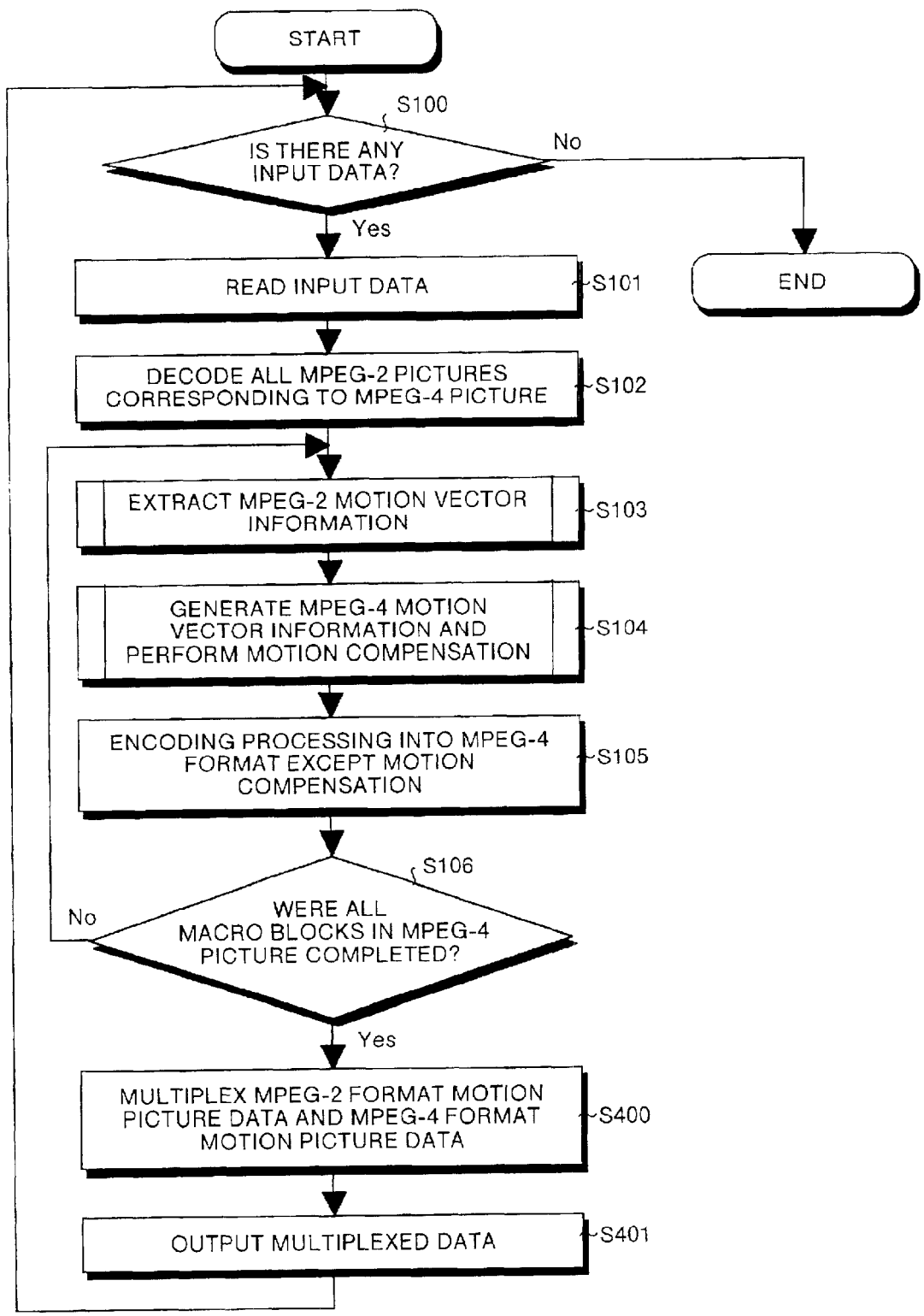
FIG. 10 is a flowchart showing the operation procedure of the motion picture data converter shown in FIG. 9.

The operation of the motion picture data converter 201 in the third embodiment will now be described, with reference to the flowchart in FIG. 10. Steps S100 to S106 for extracting the motion vector and generating the motion picture data in the MIPEG-4 format are the same operation as that in the first embodiment, and hence the description thereof is omitted.

The motion picture data converter 201 converts the motion picture data in the MPEG-2 format to the motion picture data in the MPEG-4 format, in the same manner as the operation in the first embodiment, and outputs in the data (steps S100 to S106).

Every time all the macro blocks in one picture of the MPEG-4 format is completed (step S106), the encoded motion picture data in the MPEG-2 format and the encoded motion picture data in the MPEG-4 format are input from the bit stream input section 29 and the MPEG-4 encoding section 30 to the data multiplexing section 31, and the data multiplexing section 31 multiplexes these data and inputs the data to the bit stream output section 32 (step S400).

The bit stream output section 32 subjects the multiplexed data of the input motion picture data in the MPEG-2 format and the MPEG-4 format to variable encoding or the like, and outputs the data to the outside (step S401).

In this third embodiment, the data multiplexing section 31 is provided to enable outputting outside the multiplexed data of the input motion picture data in the MPEG-2 format and the MPEG-4 format.

A fourth embodiment of the present invention will now be described. In this fourth embodiment, the functions in the above-described first to third embodiments are realized by software.

Figure 11:
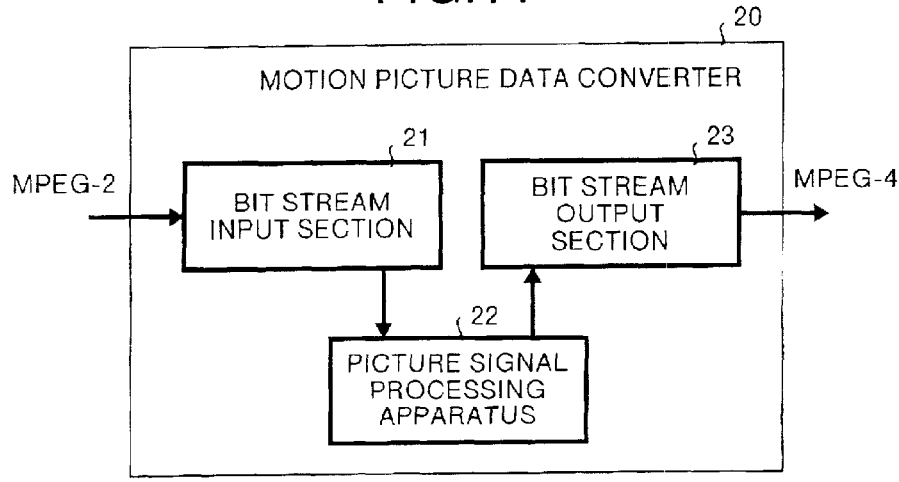
FIG. 11 is a block diagram showing the construction of a fourth embodiment of the present invention.
Figure 12:
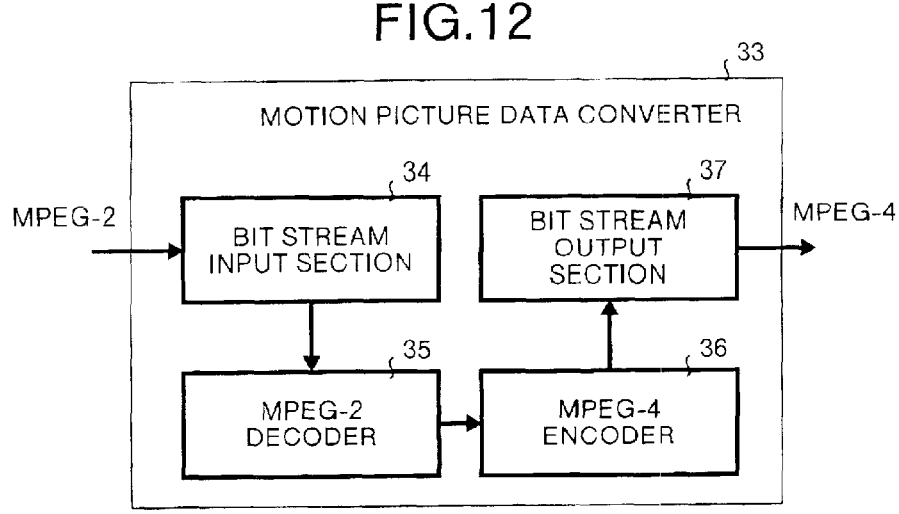
FIG. 12 is a diagram for explaining the conventional art.
Figure 13:
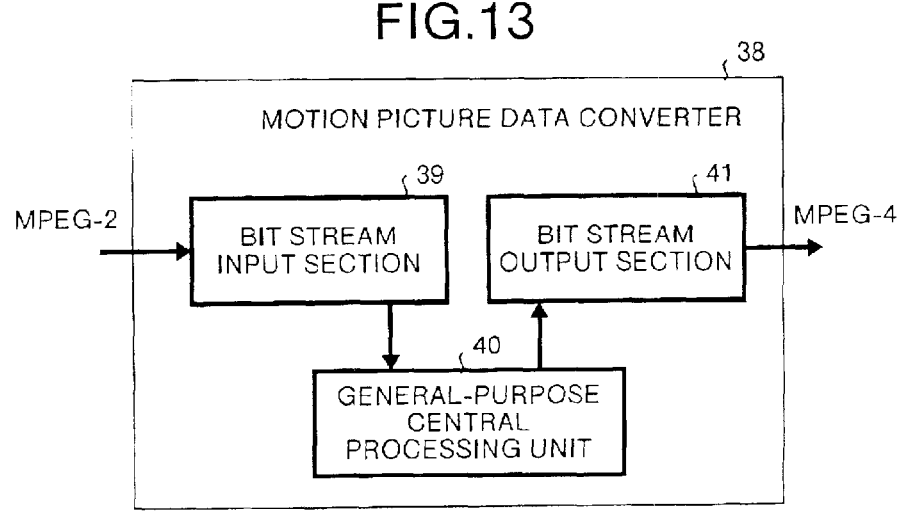
FIG. 13 is a diagram for explaining the conventional art.

A motion picture data converter 20 in the fourth embodiment shown in FIG. 11 has a bit stream input section 21, a picture signal processing apparatus 22 and a bit stream output section 23.

The bit stream input section 21 inputs the motion picture data in the MPEG-2 format and outputs the data to the picture signal processing apparatus 22.

The picture signal processing apparatus 22 comprises a software program for letting a general-purpose central processing unit (computer) execute, the above-described respective functions realized by the MPEG-2 decoding section 3, the motion vector extraction section 4, the motion compensation section 5, the MPEG-4 encoding section 6 and the whole control section 8 in the first embodiment, the above-described respective functions realized by the MPEG-2 decoding section 25, the motion vector extraction section 4, the motion compensation section 5, the MPEG-4 encoding section 26 and the whole control section 8 in the second embodiment, and the above-described respective functions realized by the MPEG-2 decoding section 3, the motion vector extraction section 4, the motion compensation section 5, the MPEG-4 encoding section 30 and the whole control section 8 in the third embodiment.

The bit stream output section 23 outputs the motion picture data in the MPEG-4 format converted by the picture signal processing apparatus 22.

As described above, even when the present invention is realized by the software program, efficient conversion from the MPEG-2 format to the MPEG-4 format can be performed, and hence the conversion processing time can be reduced, while keeping the image quality of the motion picture data after the conversion.

In each of the above-described embodiments, a simple profile, being the most basic profile, is adopted as the MPEG-4. However, the present invention is also applicable to a core profile where a bi-directional prediction mode (B-VOP) and optional-shape object encoding are added to the simple profile and prescribed, and a main profile where an interlace or the like is provided.

As described above, according to the present invention, attention is paid to the fact that a motion vector already exists in the motion picture data in the MPEG-2 format, and when the motion picture data in the MPEG-2 format is converted to the MPEG-4 format, at the time of encoding the motion picture data in the non-compressed format into the MPEG-4 format, exhaustive search for a non-compressed frame is not directly performed with respect to the motion vector, but the motion vector already existing in the motion picture data in the MPEG-2 format is extracted and converted so as to be adapted to the motion picture data in the MPEG-4 format, and is used in the motion compensation processing of the MPEG-4 encoding processing. As a result, efficient conversion from the MPEG-2 format to the MPEG-4 format can be performed, and hence the circuit scale of the apparatus can be decreased, while keeping the image quality of the motion picture data after the conversion, and the processing time can be reduced.

Furthermore, the locally decoded motion picture data used in the motion compensation processing is displayed together with the motion picture data in the non-compressed format simultaneously. As a result, correspondence between the motion picture data in the MPEG-2 format before the conversion and the motion picture data in the MPEG-4 format after the conversion is easily comprehensible, making it easy to confirm parameters such as the screen size, bit rate, target frame rate, etc. of the motion picture data in the MPEG-4 format.

In addition, the motion picture data in the MPEG-2 format and the motion picture data in the MPEG-4 format are multiplexed and output. As a result, multiplexed data of the motion picture data in the MPEG-2 format and the motion picture data in the MPEG-4 format can be obtained.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A motion picture data converter comprising:
    an MPEG-2 decoding unit which decodes motion picture data in an MPEG-2 format into motion picture data in a non-compressed format;
    a motion vector extraction unit which extracts MPEG-2 motion vector information in the MPEG-2 format from the motion picture data being decoded in said MPEG-2 decoding unit;
    a motion compensation unit which generates MPEG-4 motion vector information in an MPEG-4 format if a number of macro blocks having non-zero motion vector information exceeds a threshold, by causing the MPEG-2 extracted motion vector information to be reflected in the motion compensation processing for the MPEG-4 format, and executes the motion compensation processing, using the generated MPEG-4 motion vector information; and
    an MPEG-4 encoding unit which encodes motion picture data in the MPEG-4 format, using the motion compensation processed data output from said motion compensation unit and the motion picture data in the non-compressed format decoded in said MPEG-2 decoding unit.

2. The motion picture data converter according to claim 1, wherein said MPEG-4 encoding unit generates and outputs locally decoded motion picture data used in the motion compensation processing in said motion compensation unit, said motion picture data converter further comprises:
    a display unit which simultaneously displays the locally decoded motion picture data output from said MPEG-4 encoding unit and the motion picture data in the non-compressed format decoded in said MPEG-2 decoding unit.

3. The motion picture data converter according to claim 1, further comprising a data multiplexing unit which multiplexes and outputs the motion picture data in the MPEG-2 format and the motion picture data in the MPEG-4 format output from said MPEG-4 encoding unit.

4. A computer program for making a computer convert motion picture data in an MPEG-2 format to motion picture data in an MPEG-4 format, the computer program making the computer execute instructions comprising:
    decoding motion picture data in an MPEG-2 format into motion picture data in a non-compressed format;
    extracting MPEG-2 motion vector information in the MPEG-2 format from the motion picture data being decoded;
    generating MPEG-4 motion vector information in an MPEG-4 format if a number of macro blocks having non-zero motion vector information exceeds a threshold, by causing the extracted MPEG-2 motion vector information to be reflected in the motion compensation processing for the MPEG-4 format;
    performing motion compensation processing using the generated MPEG-4 motion vector information; and encoding motion picture data in the MPEG-4 format, using the motion compensation processed data and the motion picture data in the non-compressed format.

5. The computer program according to claim 4, wherein in the encoding, locally decoded motion picture data used in the motion compensation processing are generated and output, wherein the computer program further making the computer simultaneously display the locally decoded motion picture data and the motion picture data in the non-compressed format.

6. The computer program according to claim 4, further making the computer multiplex and output the motion picture data in the MPEG-2 format and the motion picture data in the MPEG-4 format output in the encoding.

7. A method for transforming MPEG-2 encoded video data into MPEG-4 encoded video data, comprising:

decoding video data which was encoded in an MPEG-2 format;

extracting motion vector information from the decoded video data;

associating MPEG-2 macro blocks with an MPEG-4 macro block;

accumulating, for each MPEG-4 macro block, the motion vector information corresponding to the associated MPEG-2 macro blocks having a common position;

determining whether a number of MPEG-4 macro blocks associated with non-zero accumulated motion vector information exceeds a number of MPEG-4 macro blocks associated with zero motion vector information; and generating a motion vector, for each MPEG-4 macro block, based upon the determining.

8. The method according to claim 7, wherein the associating further comprises identifying the MPEG-2 macro blocks overlapping in an area corresponding to the MPEG-4 macro block.

9. The method according to claim 8, wherein the associating further comprises classifying each identified MPEG-2 macro block for each position in at least one picture associated with the MPEG-2 format which corresponds to a picture in the MPEG-4 format.

10. The method according to claim 7, wherein the accumulating further comprises:

evaluating the existence of motion vector information for a plurality of MPEG-2 macro blocks having the same position;

summing the motion vector information for the plurality of MPEG-2 macro blocks if the evaluation determines motion vector information exists for all of the plurality of MPEG-2 macro blocks; and setting the motion vector information for the plurality of MPEG-2 macro block to zero if the evaluation determines that no motion vector information exists for any one of the plurality of MPEG-2 macro blocks.

11. The method according to claim 7, wherein if the number of MPEG-4 macro blocks associated with non-zero accumulated motion vector information exceeds a number of MPEG-4 macro blocks associated with zero motion vector information, the generating further comprises:

computing an intermediate motion vector by averaging the vector components of the accumulated motion vector information; and scaling the intermediate motion vector according to the MPEG-4 picture size to produce a final motion vector in the MPEG-4 format.

12. The method according to claim 7, wherein if the number of MPEG-4 macro blocks associated with non-zero accumulated motion vector information does not exceed a number of MPEG-4 macro blocks associated with zero motion vector information, the generating does not produce a final motion vector in the MPEG-4 format.

* * * * *